United States Patent
Nakajima et al.

(10) Patent No.: US 6,286,759 B1
(45) Date of Patent: Sep. 11, 2001

(54) MULTI-MAGNETIC HEAD FOR A CARD-SHAPED RECORDING MEDIUM

(75) Inventors: Toru Nakajima; Syuuichi Momata, both of Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/500,267

(22) Filed: Feb. 8, 2000

(30) Foreign Application Priority Data

Feb. 9, 1999 (JP) .................................................. 11-031753

(51) Int. Cl.[7] .................................................................... G06K 7/08
(52) U.S. Cl. ............................ 235/449; 235/493; 361/122
(58) Field of Search ............................ 235/449, 475, 235/453, 493, 495; 360/122, 132

(56) References Cited

U.S. PATENT DOCUMENTS

| | | | |
|---|---|---|---|
| 3,798,758 | * | 3/1974 | Stamers et al. .......................... 29/603 |
| 3,872,507 | * | 3/1975 | Sano et al. ............................ 360/102 |
| 4,160,315 | * | 7/1979 | Tandon et al. .......................... 29/603 |
| 4,949,208 | * | 8/1990 | Milo et al. ............................ 360/122 |
| 5,519,555 | * | 5/1996 | Naotoh et al. ........................ 360/120 |
| 5,535,078 | * | 7/1996 | Warwick ................................ 360/119 |
| 5,636,092 | * | 6/1997 | Nasu et al. ............................ 360/122 |
| 6,057,021 | * | 5/2000 | Ishikawa et al. .................... 428/65.3 |

FOREIGN PATENT DOCUMENTS

2000231704 * 8/2000 (JP) .................................. G11B/5/29

* cited by examiner

Primary Examiner—Karl D. Frech
Assistant Examiner—Daniel St. Cyr
(74) Attorney, Agent, or Firm—Ladas & Parry

(57) ABSTRACT

A multi-magnetic head has magnetic members defining magnetic gaps for recording information to and/or reproducing information from a card-shaped recording medium and an abrasion-resistant member having openings or notches with which the magnetic members are engaged.

5 Claims, 6 Drawing Sheets

MULTI-MAGNETIC HEAD FOR A CARD-SHAPED RECORDING MEDIUM

BACKGROUND OF THE INVENTION

1. Field of the Invention

The present invention relates generally to a magnetic head, and more particularly, to a multi-head magnetic head unit for recording and/or reproducing information to and from a card-shaped recording medium at high speed.

2. Description of the Related Art

As a practical matter, the automated reading of information from a card-shaped recording medium such as a commuter rail pass ordinarily must be done at high speed in order to be effective. The reading of information from such a card-shaped recording medium is accomplished by sliding the card-shaped recording medium over the surface of a magnetic head unit containing a plurality of magnetic gap portions that read magnetic information recorded on the recording medium. For convenience, hereinafter such a magnetic head unit containing a plurality of magnetic gap portions is referred to simply as a multi-magnetic head, while the card-shaped recording medium described above is referred to simply as a magnetic card.

It will be appreciated that the surface of the magnetic head that comes into sliding contact with the magnetic card should be made from a material that is resistant to abrasion, and conventionally these surfaces are typically made from one or another such abrasion-resistant material.

FIG. 1 shows an example of a conventional multi-magnetic head for reading a magnetic card, in which an anti-abrasion material member is provided at the surface that contacts the magnetic card. A multi-magnetic head 1 comprises a plurality of pairs of holders 2a, 2b made of a nonmagnetic material, each of the pairs supporting respective halves of a plurality of pairs of magnetic cores 3a, 3b, the pairs of magnetic cores 3a, 3b Joined so as to form gaps 3c therebetween into which gap spacers 9 are inserted, with the whole assembly contained in a shield casing 4. It should be noted that magnetic shields 5 are positioned between each of the pairs of magnetic cores 3a, 3b. Finally, between each of the gaps 3c, that is, between each of the pairs of magnetic cores 3a, 3b exposed in the gap 3c, and each of the magnetic shields 5 an abrasion-resistant ceramic chip 6 is inserted into concavities formed in the holder 2a, 2b for that purpose.

In the case of a magnetic head reading a magnetic card, the edge of the magnetic card hits the magnetic head at high speed. The action of the edge of the magnetic card hitting the magnetic head at high speed, when repeated with a large number of magnetic cards over an extended period of time, causes much wear on the magnetic head, particularly as compared to a case in which a continuous recording medium such as a magnetic tape runs smoothly and continuously over the surface of a magnetic head.

Providing an abrasion-resistant material member between each of the exposed pairs of magnetic cores 3a, 3b and each of the magnetic shields 5 as described above reduces to some extent the impact of the edge of the magnetic card hitting the magnetic head, that is, the exposed pairs of magnetic cores 3a, 3b. However, these abrasion-resistant material members are positioned to the sides of the magnetic head and therefore do not fully blunt the impact of the edge of the magnetic card.

In addition, as more information continues to be stored on the magnetic cards and the number of tracks on the magnetic cards thus continues to increase, so, too, does the number of magnetic heads, that is, magnetic cores, with the result that the number of abrasion-resistant material members positioned between the magnetic cores and the magnetic shields also increases, thus complicating the process of producing the multi-magnetic heads and increasing the cost of production as well.

SUMMARY OF THE INVENTION

Accordingly, it is a general object of the present invention to provide an improved and useful multi-magnetic head in which the disadvantages described above are eliminated.

Another and more specific object of the present invention is to provide an improved and useful multi-magnetic head in which wear on the magnetic heads due to abrasion caused by repeated contact of an edge of a magnetic card with the magnetic heads is reduced.

Yet another and more specific object of the present invention is to provide an improved and useful multi-magnetic head in which the number of parts used in the manufacture of the multi-magnetic head is reduced, thus simplifying the process of producing the multi-magnetic head and reducing the cost of production as well.

The above-described objects of the present invention are achieved by a multi-magnetic head comprising:

magnetic members defining magnetic gaps for recording information to and/or reproducing information to and from a card-shaped recording medium; and an abrasion-resistant member having openings or notches with which the magnetic members are engaged.

Additionally, the above-described objects of the present invention are also achieved by the multi-magnetic head as described above, wherein the abrasion-resistant member comprises a pair of panel-like members having the openings or notches.

Additionally, the above-described objects of the present invention are also achieved by the multi-magnetic head as described above, further comprising a single gap spacer commonly inserted in the gaps.

Additionally, the above-described objects of the present invention are also achieved by the multi-magnetic head as described above, wherein the abrasion-resistant member includes a plurality of members each having at least one opening with which the magnetic members are engaged.

Additionally, the above-described objects of the present invention are also achieved by the multi-magnetic head as described above, further comprising shield members adjacent to the magnetic members that magnetically isolate the magnetic members from each other.

According to the invention described above, by providing an abrasion-resistant material member between the magnetic head and the magnetic card a direct collision between the magnetic head and the edge of the magnetic card can be prevented, thus eliminating wear on the magnetic head caused by contact with the edge of the magnetic card. In addition, localized wear on the multi-magnetic head caused by contact with the edge of the magnetic card can be reduced. Moreover, the need to provide an abrasion-resistant member for each gap-forming magnetic core is eliminated, thereby reducing the number of constituent parts and thus simplifying the process of production and reducing the cost of production as well.

Other objects, features and advantages of the present invention will become more apparent from the following detailed description when read in conjunction with the accompanying drawings.

DESCRIPTION OF THE PREFERRED EMBODIMENTS

A description will now be given of a multi-magnetic head according to a first embodiment of the present invention, with reference to the accompanying drawings, in the first instance FIGS. 2, 3, 4 and 5.

Figure 2:
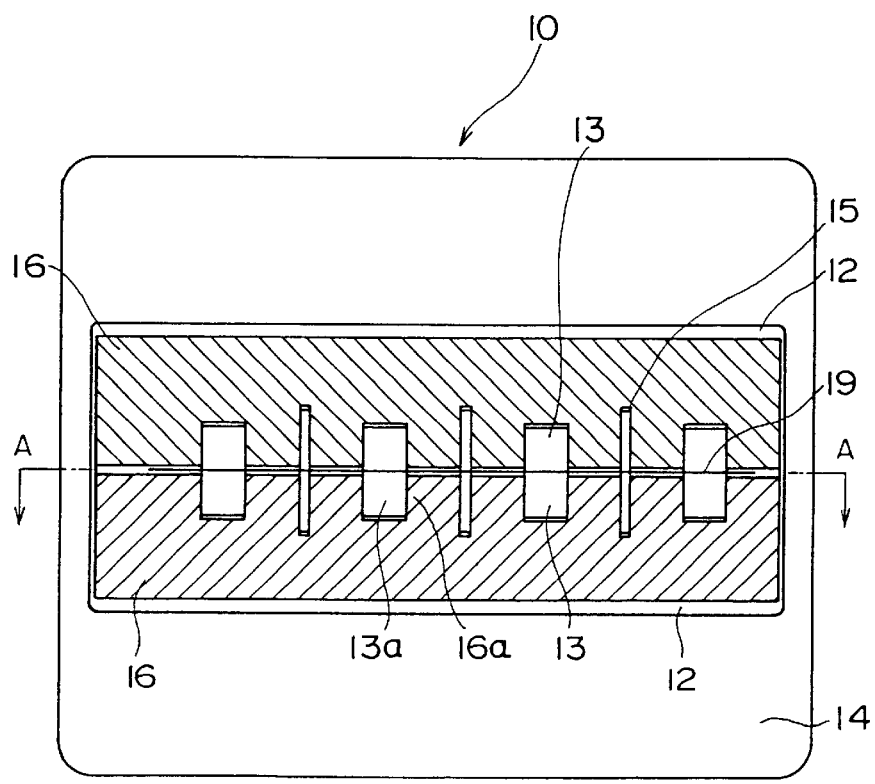
FIG. 2 shows a plan view of a multi-magnetic head for recording and/or reproducing information to and from a magnetic card according to a first embodiment of the present invention.
Figure 3:
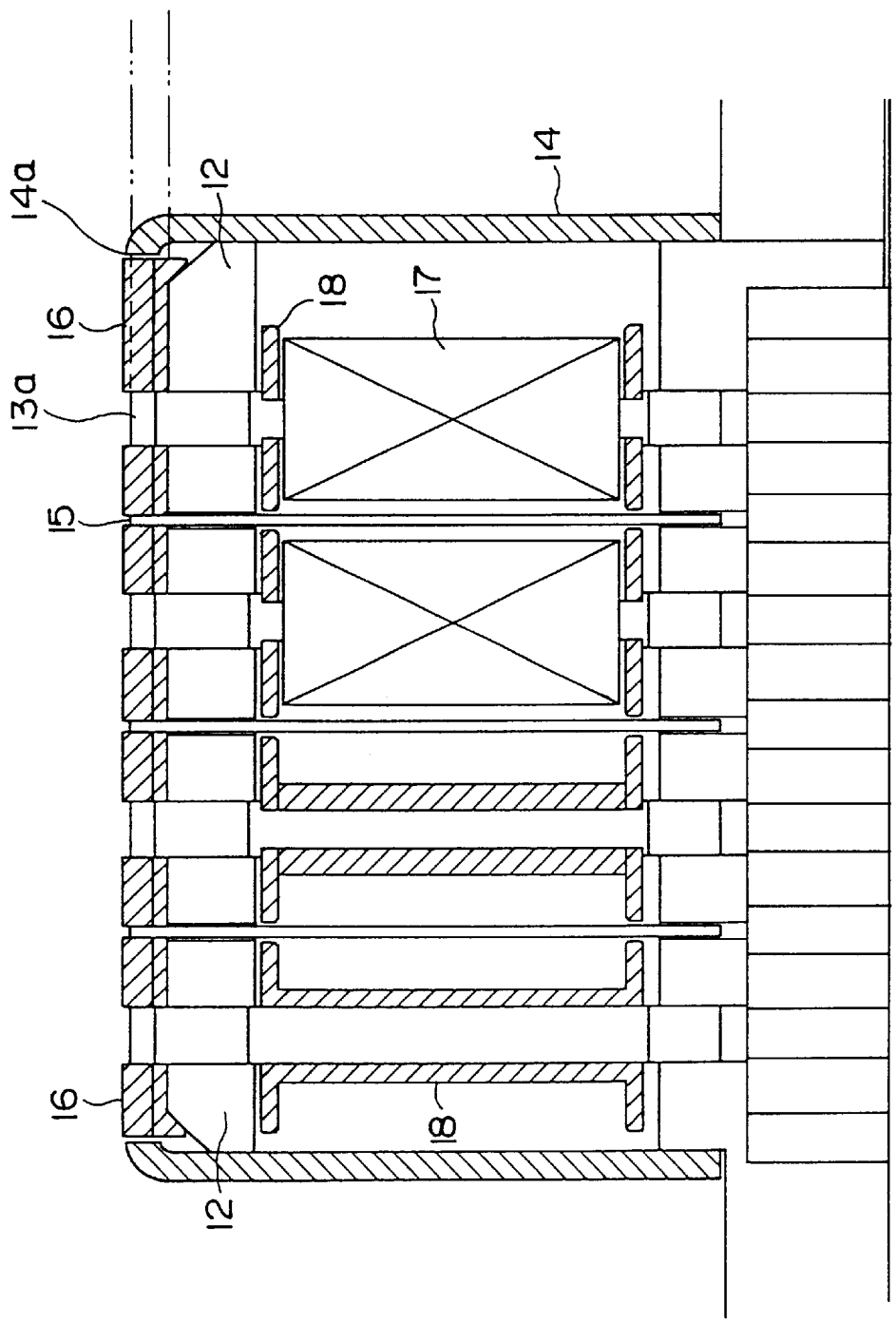
FIG. 3 is a cross-sectional view along a line A—A of the multi-magnetic head shown in FIG. 2.
Figure 4:
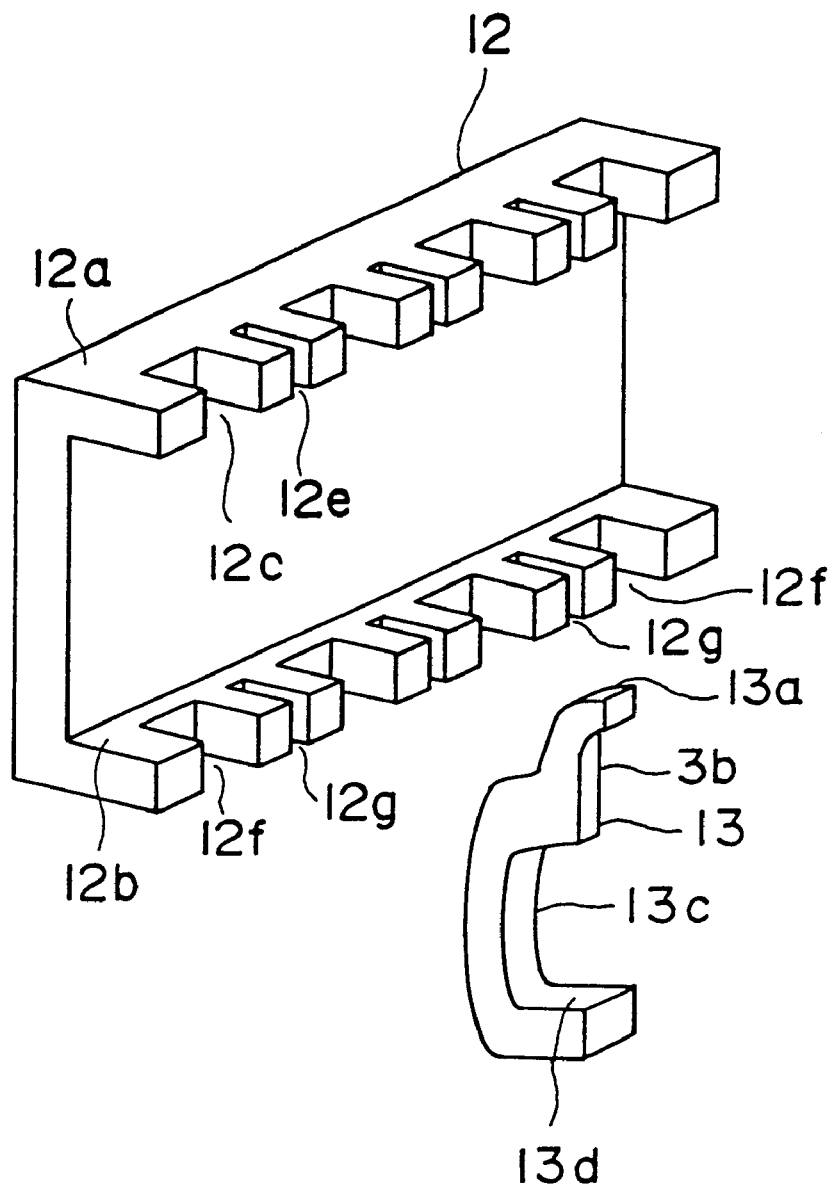
FIG. 4 is a schematic diagram of a magnetic core and a core holder.
Figure 5:
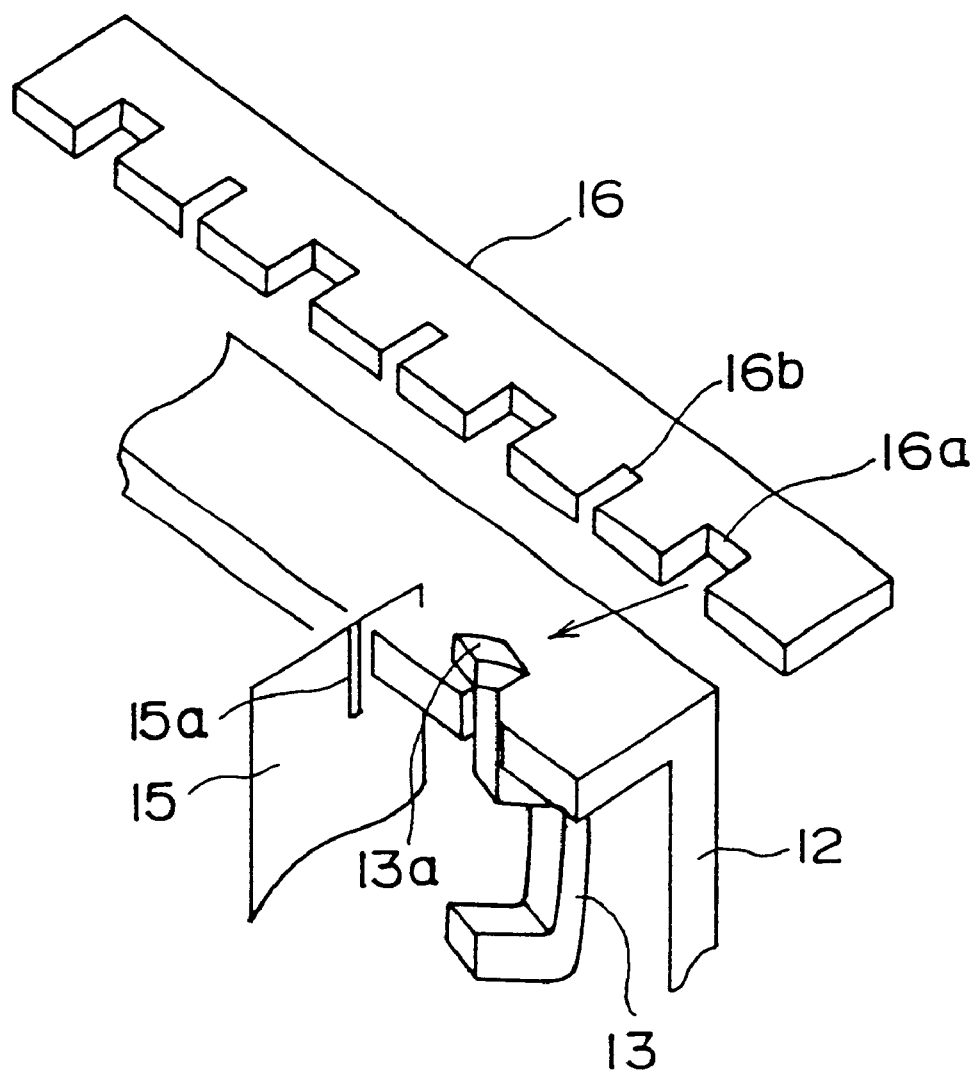
FIG. 5 is a diagram for illustrating mounting an abrasion-resistant member on an assembly comprising the magnetic member mounted on the core holder.

FIG. 2 shows a plan view of the multi-magnetic head for recording information to and/or reproducing information from a recording medium according to a first embodiment of the present invention. FIG. 3 is a cross-sectional view along a line A—A of the magnetic head shown in FIG. 2. FIG. 4 is a schematic diagram of a magnetic core and a core holder. FIG. 5 shows a structure for mounting the magnetic member on the core holder and abrasion-resistant member.

As shown in FIGS. 2 and 3, the multi-magnetic head 10 for recording information to and/or reproducing information from a card-shaped recording medium according to the first embodiment of the present invention comprises a plurality of magnetic cores 13 supported by a pair of core holders 12, the magnetic cores 13 being inserted in bobbins around which coils 17 not shown in the diagrams are wound and the cores positioned so as to face each other and form gaps 13a, the whole assembly being housed in a shield casing 14 having an opening 14a, with the gaps 13a formed by the magnetic cores 13 exposed to the opening 14a. A plate-like magnetic shield 15 is provided between each adjacent pair of magnetic cores 13 in such a way as to be supported by the core holders 12, to magnetically isolate the magnetic cores 13 from each other. A gap spacer 19 made of a nonmagnetic material such as mica is inserted in the gap portions 13a formed by each of the opposed pairs of magnetic cores 13. It should be noted that the gap spacer 19 of the multi-magnetic head 10 according to the present embodiment is a single long, thin, panel-like member common to all the magnetic cores 13.

A panel-shaped abrasion-resistant member 16 made of a zirconium-type ceramic material is provided on a top surface of each half of the pair of core holders 12. As will be explained more fully later, openings or notch portions are formed on this abrasion-resistant member 16 so as to engage and support the gap-forming top portions 13a of the magnetic cores 13 as well as the edges of the magnetic shields, in such a way that the gap forming portions 13a remain in an exposed state with the abrasion-resistant member made of ceramic disposed on a periphery thereof, and the whole assembly exposed via the opening 14a in the shield casing 14. It is this exposed portion of the multi-magnetic head 10 that comes into sliding contact with the magnetic card.

FIG. 4 is a schematic diagram of a magnetic core 13 and a core holder 12. As shown in the diagram, the magnetic core 13 that is supported by the core holder 12 has the gap forming portion 13a described above, a neck portion 13b directly beneath the gap portion 13a, a torso portion 13c around which a coil bobbin not shown in the diagram would be wound, and a bottom base or leg portion 13d.

The core holder 12 is made from a non-magnetic material such as aluminum die cast, lead die cast, copper alloy or the like. In cross-section the core holder 12 is shaped substantially like the letter "C" and has a predetermined length. A plurality of notches 12c exactly equal to the number of magnetic cores 13, which in the case of the present embodiment is four, is formed in a top panel 12a, into which notches 12c are inserted the magnetic cores 13. Additionally, a slit 12e is formed between each of the notches 12c to accommodate the magnetic shields 15, into which slits 12e the magnetic shields 15 are inserted. Additionally, notches 12f and slits 12g are formed in a base panel 12b of the core holder 12 in such a way as to correspond to the notches 12c and slits 12e in the top panel 12b described above.

Mounting of the magnetic core 13 on the core holder 12 is accomplished by inserting the neck portion 13b of the magnetic core 13 into the notch 12c formed in the top panel 12a of the core holder 12 and inserting the torso portion 13d of the magnetic core 13 into the notch 12f formed in the base panel 12b of the core holder 12.

In such a state, that is, in a state in which the magnetic core 13 is mounted on the core holder 12 as described above, the top gap forming portion 13a of the magnetic core 13 projects slightly above the surface of the top panel 12a of the core holder 12 and at the same time slightly beyond the edges of the top panel 12a of the core holder 12.

It should be noted that a bobbin around which a coil is wound is provided on the torso portion 13c of the magnetic core 13 mounted on the core holder 12. For ease of illustration, however, the bobbin and coil have been omitted from FIG. 4.

Similarly, the magnetic shields 15 are inserted into and thereby supported by the upper and lower slits 12e and 12g formed in the top and base panels 12a and 12b, respectively, of the core holder 12.

FIG. 5 is a diagram for illustrating mounting an abrasion-resistant member on an assembly comprising the magnetic member mounted on the core holder. As described previously, the magnetic core 13 is mounted on the core holder 12 in such a way that the gap forming portion 13a of the magnetic core 13 projects slightly above the surface of the top panel 12a of the core holder 12. Additionally, the magnetic shield 15 similarly is mounted on the core holder 12 in such a way that an edge of the magnetic shield 15 projects slightly above the top panel 12a of the core holder 12. The extent to which the gap forming portion 13a of the magnetic core 13 and the edge of the magnetic shield 15 project above the surface of the top panel 12a of the core holder 12 is substantially equivalent to the thickness of the abrasion-resistant member 16.

A plurality of notches 16a equal in number to the number of magnetic cores 13 are formed in the abrasion-resistant member 16. The magnetic cores 13 are inserted into the notches 16a. Similarly, a slit 16b is formed between each of the notches 16a. The magnetic shields 15 are inserted into the slits 16b.

The abrasion-resistant member 16 is mounted on a top surface of the top panel 12a of the core holder 12, in which state the gap forming member 13a of each of the magnetic cores 13 and the edges of each of the magnetic shields 15 are inserted into one of the notches 16a and slits 16b, respectively, formed in the abrasion-resistant member 16.

Each of a pair of core holders 12 mounting the magnetic cores 13, magnetic shields 15 and abrasion-resistant members 16 as described above is inserted in the shield casing 14 in such a way as to be disposed opposite each other, a single gap spacer 18 is inserted in a gap portion formed between each of the pair of core holders 12, the top panel 12a of the core holder 12 is coated with a resin adhesive material and the pair of core holders 12 are fixedly mounted therein. It should be noted that the gap spacer 19 is a single member common to all gaps, so a slit 15a is formed in each of the magnetic shields 15 for insertion of the gap spacer 19 as shown in FIG. 5.

Figure 6:
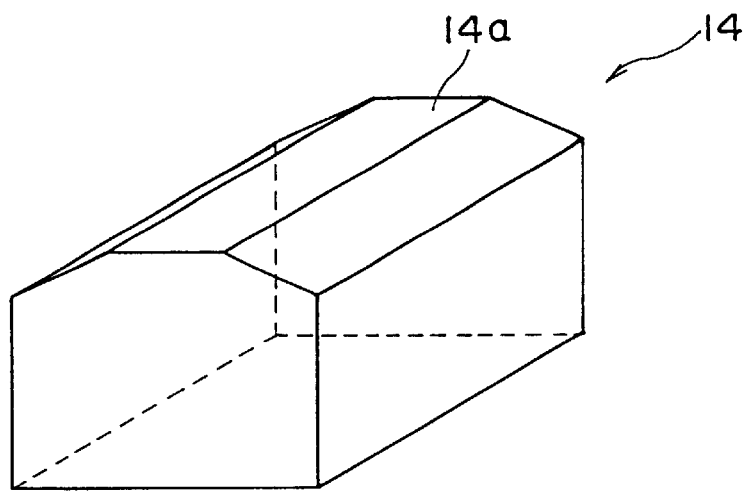
FIG. 6 is a schematic diagram of the magnetic shield.

The shield casing 14, as noted previously, has an opening 14a in a top portion thereof. A bottom portion of the shield casing 14 is open, so the shield casing 14 forms a substantially box-like shape as shown in FIG. 2 and as shown schematically in FIG. 6. The shield casing 14 contains the entire multi-magnetic head 10 by covering the multi-magnetic head 10 from above, in such a way that, as described previously, only the gap forming portion 13a and the abrasion-resistant member 16 are exposed via the opening 14a described above.

The portion of the multi-magnetic head 10 contained within the shield casing 14 that is exposed at the opening 14a of the shield case 14 is polished with a polisher to form a perfectly smooth surface. By doing so, the abrasion-resistant member 16, the gap forming member 13a of the magnetic core 13, the gap spacer 19 and the magnetic shield 15 form a perfectly flush surface with the portion of the multi-magnetic head 10 that is exposed at the opening 14a. It is this exposed portion that forms the sliding surface that contacts the magnetic card.

Figure 7:
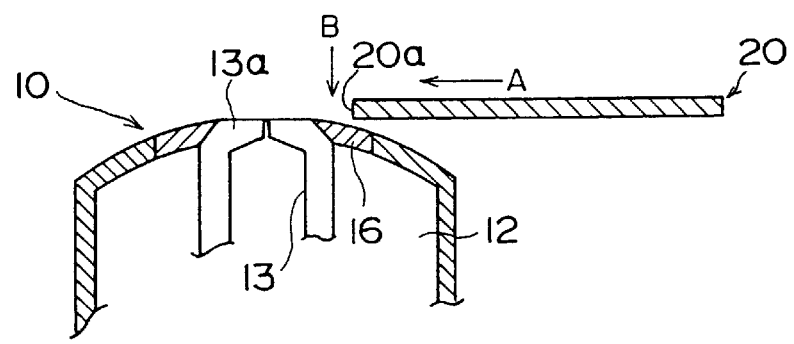
FIG. 7 is a cross-sectional diagram for illustrating the effect of the multi-magnetic head according to the present invention.

FIG. 7 is a cross-sectional diagram for illustrating a contact between the multi-magnetic head 10 according to the present embodiment and a magnetic card 20. The magnetic card 20 approaches the multi-magnetic head 10 at a direction of travel indicate din the diagram by arrow A and comes into sliding contact with the multi-magnetic head 10. However, as can be appreciated from the diagram, an edge portion 20a of the magnetic card 20 first contacts the abrasion-resistant member 16, so direct contact between the edge portion 20a and the gap forming member 13a of the magnetic core 13 can be avoided. In the present embodiment, the abrasion-resistant member 16 is disposed at the portion of the gap forming portion 13a of the magnetic core 13 that lies in the path of approach of the magnetic card 20, so the force of impact of the magnetic card 20 on the gap forming portion 13a can be reduced and, consequently, damage to and wear on the gap forming portion 13a can be greatly reduced.

Figure 1:
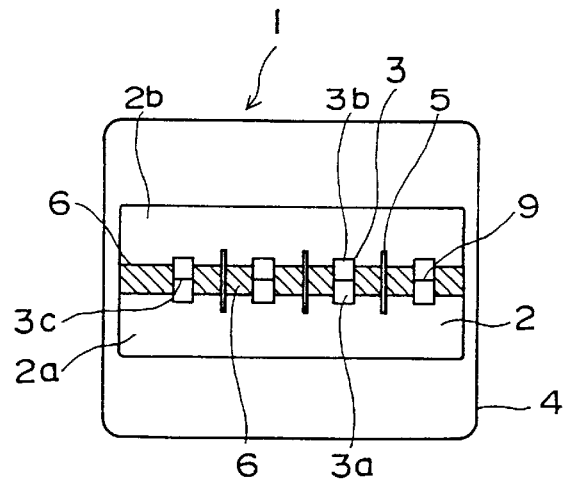
FIG. 1 shows a conventional magnetic head for recording and/or reproducing information to and from a magnetic card.

Additionally, in the multi-magnetic head 10 according to the present embodiment a single abrasion-resistant member 16 is used for each half of the pair of core holders 12 as shown in FIG. 1, thus reducing the number of parts to be produced and simplifying the production process as compared to a case in which a separate magnetic shield 15 is provided between each gap. Moreover, in the present embodiment, the gap spacer 19 similarly comprises a single member common to all the gaps, thus reducing the number of parts to be produced and simplifying the production process as compared to a case in which a separate gap spacer 19 is provided for each gap.

It should be noted that, as noted previously, in the embodiment described above the gap spacer 19 is a single member common to all gaps, so a slit 15a is formed in each of the magnetic shields 15 disposed between the gaps so as to insert the gap spacer 19 in the magnetic shields 15. Alternatively, however, each of the magnetic shields 15 may be made of two equal halves, with each half supported by the respective core holders 12.

A description will now be given of a multi-magnetic head according to second embodiment of the present invention, with reference to FIG. 8.

Figure 8:
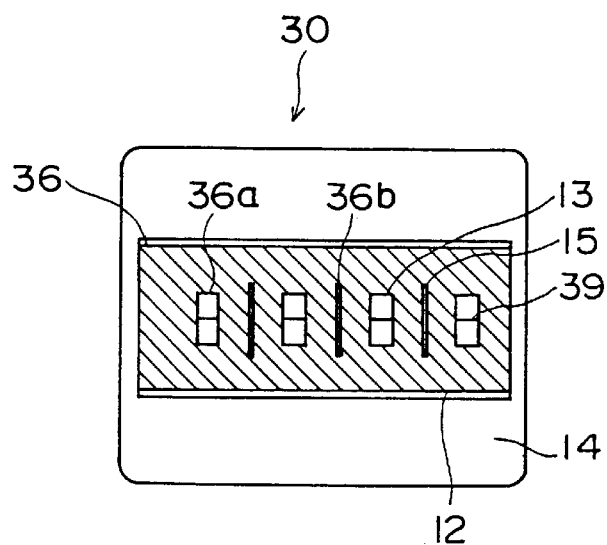
FIG. 8 is a plan view of a multi-magnetic head according to a second embodiment of the present invention.

FIG. 8 shows a multi-magnetic head 30 according to a second embodiment of the present invention, which differs from the multi-magnetic head 10 of the first embodiment only with respect to the abrasion-resistant member 16 and the gap spacer. Accordingly, a description will be given of just these two components, with a description of the rest of the multi-magnetic head 30 omitted. It should be noted that parts shown in FIG. 8 that correspond to parts shown in FIG. 2 are given corresponding reference numbers and a description thereof omitted.

The multi-magnetic head 30 has a panel-shaped abrasion-resistant member 36 made of a ceramic material. The abrasion-resistant member 36 has the shape of the abrasion-resistant member 16 shown in FIG. 5 but is formed of a single member instead of the two opposed halves as with the multi-magnetic head 10 according to the first embodiment. In addition, slots 36a are formed therein to accommodate the gap forming portions 13a of each pair of magnetic cores 13 supported by a pair of core holders 12. Further, slots 36b are formed therein to accommodate magnetic shields 15 inserted so as be supported by the core holders 12 as well as to project above the top panel 12a of the core holders 12. It will be noted that a gap spacer 39 is provided at each gap portion of each magnetic core 13.

According to the multi-magnetic head 30 according to the second embodiment of the present invention, the operation of mounting the abrasion-resistant member 36 at the portion of the multi-magnetic head 30 that comes into sliding contact with the magnetic card 20 is reduced to a single action because the abrasion-resistant member 36 is a single piece, thus the overall process of production can be simplified.

In addition, as with the first embodiment, the abrasion-resistant member 16 is disposed at the portion of the gap forming portion 13a of the magnetic core 13 that lies in the path of approach of the magnetic card 20, so the force of impact of the magnetic card 20 on the gap forming portion 13a can be reduced and, consequently, damage to and wear on the gap forming portion 13a can be greatly reduced.

A description will now be given of a multi-magnetic head according to third embodiment of the present invention, with reference to FIG. 9. It should be noted that parts shown in FIG. 9 that correspond to parts shown in FIG. 2 are given corresponding reference numbers and a description thereof omitted.

Figure 9:
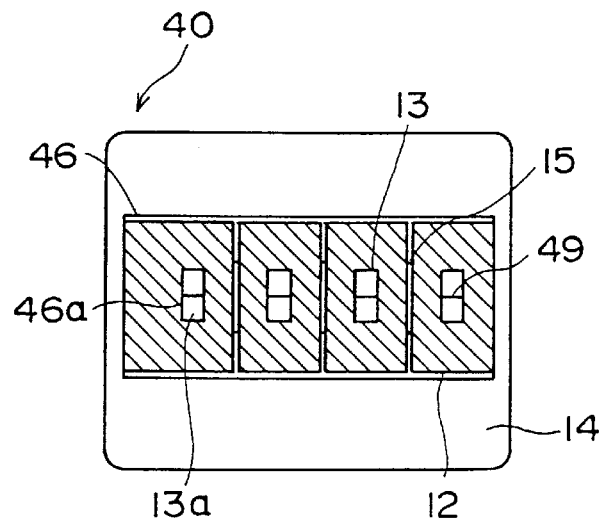
FIG. 9 is a plan view of a multi-magnetic head according to a third embodiment of the present invention.

FIG. 9 is a plan view of a multi-magnetic head 40 according to a third embodiment of the present invention. As shown in the diagram, a separate abrasion-resistant member 46, made of a ceramic material, is provided for each of four gap forming portions 13a of each of four respective magnetic cores 13. In addition, a slot 46a for accommodating and exposing the gap forming portions 13a of the magnetic cores 13 is formed in each of the abrasion-resistant members 46.

It should be noted that, in the present invention, the abrasion-resistant member 46 is made small enough to avoid covering the magnetic shield 15, so it is not necessary to form a slit in the abrasion-resistant member 46 in order to accommodate the magnetic shield 15. In other words, as shown in FIG. 9 the magnetic shield 15 mounted on the core holder 12 fits in between adjacent abrasion-resistant members 46. In the present embodiment there is thus no abrasion-resistant member 46 interposed between the magnetic shield 15 and an approaching magnetic card 20. Nevertheless, as with the previous embodiments described above, the abrasion-resistant member 46 is disposed between the exposed gap-forming portion 13a of the magnetic core 13 and the leading edge of an approaching magnetic card 20.

It should be noted that in the multi-magnetic head 10 according to the embodiment shown in FIGS. 2, 3, 4, 5, 6 and 7, the gap spacer 19 is a single member common to all gaps, so a slit 15a must be formed in each of the magnetic shields 15 for insertion of the gap spacer 19. By contrast, in the multi-magnetic head 10 according to the embodiments shown in FIGS. 8 and 9 a separate gap spacer 19 is inserted into each gap, so it is not necessary to form the above-described slit in the magnetic shields.

The above description is provided in order to enable any person skilled in the art to make and use the invention and sets forth the best mode contemplated by the inventors of carrying out the invention.

The present invention is not limited to the specifically disclosed embodiments and variations, and modifications may be made without departing from the scope of the present invention.

The present application is based on Japanese Priority Application No. 11-031753, filed on Feb. 9, 1999, the entire contents of which are hereby incorporated by reference.

What is claimed is:

1. A multi-magnetic head comprising:

magnetic members defining magnetic gaps for recording information to and/or reproducing information to and from a card-shaped recording medium;

a shield member accommodating the magnetic members; and an abrasion-resistant member provided between the shield member and the magnetic members, the abrasion resistant member having openings or notches with which the magnetic members are engaged so that a part of the abrasion-resistant member extends between the shield casing and the magnetic members in a direction perpendicular to an extending direction of the magnetic gaps.

2. The multi-magnetic head as claimed in claim 1, wherein the abrasion-resistant member comprises a pair of panel members having the openings or notches.

3. The multi-magnetic head as claimed in claim 2, further comprising a single gap spacer member inserted in the gaps.

4. The multi-magnetic head as claimed in claim 1, wherein the abrasion-resistant member includes a plurality of members each having at least one opening with which the magnetic members are engaged.

5. The multi-magnetic head as claimed in claim 1, wherein the shield member surrounds the abrasion-resistant member so as to magnetically isolate the magnetic members from each other.

* * * * *